US010565409B2

(12) United States Patent
Lee et al.

(10) Patent No.: US 10,565,409 B2
(45) Date of Patent: *Feb. 18, 2020

(54) KEY LOCKER WITH SELECTIVE ACCESS

(71) Applicant: Firstech, LLC, Kent, WA (US)

(72) Inventors: Jason Lee, Bellevue, WA (US); Jason Henry Kaminski, Renton, WA (US)

(73) Assignee: Firstech, LLC WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,463

(22) Filed: Jun. 18, 2019

(65) Prior Publication Data

US 2019/0303632 A1    Oct. 3, 2019

Related U.S. Application Data

(63) Continuation of application No. 15/992,832, filed on May 30, 2018, now Pat. No. 10,366,260.

(60) Provisional application No. 62/512,285, filed on May 30, 2017.

(51) Int. Cl.
    *G06K 7/10*     (2006.01)
    *G06K 19/07*    (2006.01)
    *B60R 25/20*    (2013.01)
    *B60R 25/24*    (2013.01)
    *G06Q 10/06*    (2012.01)

(52) U.S. Cl.
    CPC .......... *G06K 7/10366* (2013.01); *B60R 25/20* (2013.01); *B60R 25/24* (2013.01); *G06K 19/0723* (2013.01); *G06Q 10/06311* (2013.01)

(58) Field of Classification Search
    CPC .................................................. G06K 7/10366
    USPC ................................................. 235/382, 380
    See application file for complete search history.

(56) References Cited

U.S. PATENT DOCUMENTS

| | | | | |
|---|---|---|---|---|
| 6,570,486 | B1 * | 5/2003 | Simon | B60R 25/04 307/10.2 |
| 2004/0150508 | A1 * | 8/2004 | Mosgrove | B60R 25/23 340/5.21 |
| 2007/0090921 | A1 * | 4/2007 | Fisher | G07C 9/00103 340/5.73 |
| 2007/0159297 | A1 * | 7/2007 | Paulk | B60R 25/104 340/5.73 |
| 2007/0273534 | A1 * | 11/2007 | McGinn | G06Q 30/02 340/572.8 |
| 2009/0167526 | A1 * | 7/2009 | Graves | G07O 9/00309 340/540 |
| 2009/0224890 | A1 * | 9/2009 | Kim | G06K 19/0705 340/10.33 |
| 2014/0232322 | A1 * | 8/2014 | Kracker | H02J 7/0054 320/103 |
| 2016/0103780 | A1 | 4/2016 | Dentamaro et al. | |
| 2016/0180621 | A1 * | 6/2016 | Desinor, Jr. | G07C 9/00896 |

* cited by examiner

*Primary Examiner* — Allyson N Trail
(74) *Attorney, Agent, or Firm* — Freestone IP Law PLLC; Aaron J Visbeek; Andrew J Cameron

(57) ABSTRACT

A key locker sized to store a key provides selective access. A radio signal is selectively allowed to reach a radio device of the key based on an access signal and/or access data.

20 Claims, 9 Drawing Sheets

KEY LOCKER WITH SELECTIVE ACCESS

CROSS-REFERENCE TO RELATED APPLICATIONS

This application is a continuation of pending U.S. non-provisional patent application Ser. No. 15/992,832 entitled "Vehicle Key Locker" and filed May 30, 2018, which claims priority to U.S. provisional Application No. 62/512,285 filed May 30, 2017. Application Ser. No. 15/992,832 and application 62/512,285 are hereby incorporated by reference.

BACKGROUND INFORMATION

Increasingly, different vehicle sharing services are providing opportunities to access vehicles. Some vehicle sharing services provide access by the minute, hour, and/or days. Some vehicle sharing services provide a fleet of vehicles that are accessed by consumers. Other vehicle sharing services are peer-to-peer. In some contexts, a company possesses a fleet of vehicles and desires to selectively provide access to different operators or employees for specific periods of time.

In vehicle sharing contexts, logistical challenges arise from physically providing a vehicle key to the intended driver for the proper amount of time. Additionally, providing the vehicle key to a driver may limit access of the vehicle to a different driver who would be authorized to use the vehicle. Furthermore, providing the key to the vehicle exposes the provider to risk that the key will be copied or retained for malicious purposes.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
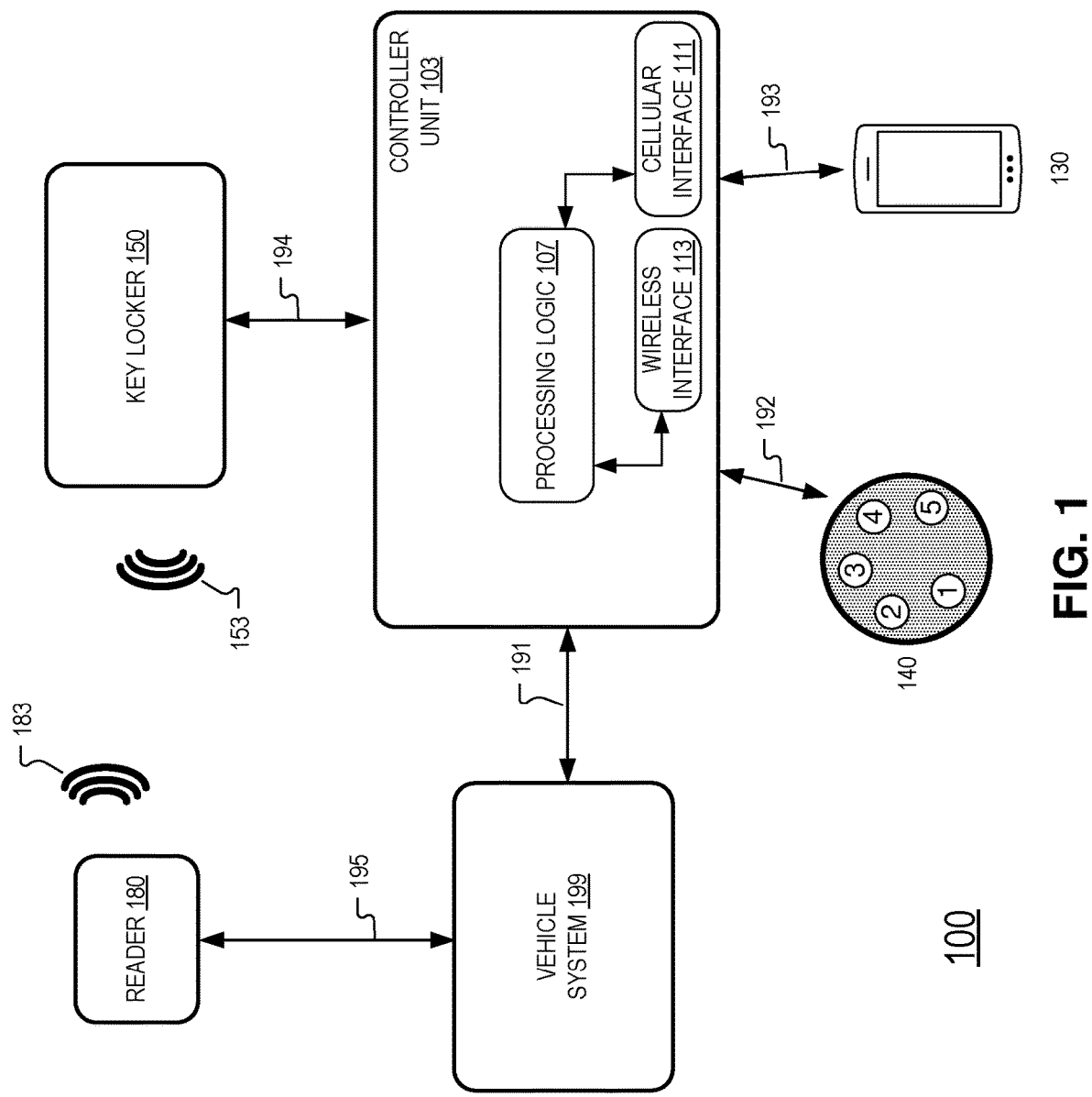
FIG. 1 includes an example system that includes a controller unit, a keypad, a mobile device, a vehicle system, a vehicle reader, and a key locker, in accordance with an embodiment of the disclosure.

Embodiments of a system, apparatus, and method for a vehicle key locker are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Embodiments of the disclosure include a vehicle key locker that selectively shields a vehicle key stored in the key locker from starting the vehicle. For example, in one embodiment, a vehicle key locker is formed of plastic with an integrated metal mesh that prevents radio signals from being received by or transmitted from a radio-frequency identification (RFID) tag of the vehicle key. Without access to the RFID tag of the vehicle key, the vehicle will not start. A key locker door may also be formed of a plastic and/or metal that prevents the transmission of a particular frequency of radio signals. When an access signal is provided to the key locker, an access actuator may open the key locker door to allow the transmission of the radio signals. The key locker door may be opened a distance wide enough to provide transmission of the radio signals to start the vehicle while not allowing a person to remove the vehicle key from the key locker.

A system that include a key locker may receive access data and access codes from a wireless interface. A keypad may also be used by users to input access data. The access code(s) may be sent to the system by a provisioning server. When access data matches access code(s) stored in a memory of the system, the key locker may be selectively opened to provide access to a key in the key locker or open a key locker door of the key locker to allow the vehicle to be started by a radio response signal from a vehicle key in the key locker.

Utilizing particular embodiments of the disclosure, access to a vehicle may be assigned to a particular person having the access data for a particular amount of time. Furthermore, the physical vehicle key does not need to be exchanged and access to the vehicle key need not be provided so that a user who has access to the vehicle may not retain or copy the vehicle key. In contrast, existing vehicle sharing services have the vehicle key inside the vehicle and accessible to the user. In some embodiments, access to remove the vehicle key from key locker is provided and the key locker senses when a key is put back into the key locker.

The embodiments of the disclosure described above and additional embodiments are described in detail below with respect to FIGS. 1-9.

FIG. 1 includes an example system 100 that includes a controller unit 103, a keypad 140, a mobile device 130, a vehicle system 199, a vehicle reader 180, and a key locker 150, in accordance with an embodiment of the disclosure. Controller unit 103 includes processing logic 107, cellular interface 111, and wireless interface 113. Processing logic 107 may include one or more processors, microprocessors, multi-core processors, and/or Field Programmable Gate Arrays (FPGAs) to execute operations disclosed herein. One or more volatile and/or non-volatile memory (not illustrated) may be communicatively coupled to the processing logic 107 to store instructions to execute operations and/or store data.

Keypad 140 is communicatively coupled to controller unit 103 via communication channel 192. In one example, communication channel 192 is a wireless communication channel (e.g. BlueTooth and/or WiFi/802.11x). Mobile device 130 is communicatively coupled to controller unit 103 via communication channel 193. In one example, communication channel 193 is a wireless communication channel (e.g. BlueTooth and/or WiFi/802.11x). Vehicle system 199 is communicatively coupled to controller unit 103 via communication channel 191. In one example, communication channel 191 is a wired communication channel utilizing CAN (Controller Area Network) bus protocols. Key locker 150 is communicatively coupled to controller unit 103 via communication channel 194. In one example, communication channel 194 is a wireless communication channel (e.g. BlueTooth and/or WiFi/802.11x). In one example, communication channel 194 is a wired communication channel, utilizing I²C (Inter-Integrated Circuit), or SPI (Serial Peripheral Interface) protocols. Communication channel 194 may be an encrypted channel. Vehicle reader 180 is communicatively coupled to vehicle system 199 via communication channel 195. Communication channels 191, 192, 193, 194, and 195 may be either wired or wireless, in different embodiments.

In one embodiment, keypad 140 can be placed on the inside of a vehicle (e.g. under the windshield) and the buttons of the keypad are capacitive-sense buttons such that the buttons are sensitive to a finger "pressing" the button through the glass of the vehicle. In one embodiment, keypad 140 is configured to be mounted on the outside of the vehicle.

In one embodiment, a user uses a mobile application (running on mobile device 130) having access data to wirelessly transmit the access data to controller unit 103. In one embodiment, the access data is transmitted from mobile device 130 to wireless interface 113 via BlueTooth. The user may enter the access data into the mobile application or the access data may be provided to the mobile application via a server that stores reservation data. The access data may be received by the mobile device 130 via a cellular connection or a WiFi connection.

In one embodiment, the access data is transmitted from mobile device 130 to wireless interface 113 using IEEE 802.11x protocols and frequencies. Wireless interface 113 may be configured to receive and/or transmit BlueTooth and/or WiFi. In one embodiment, the access data is transmitted from mobile device 130 to cellular interface 111 using cellular data (cellular data tower not illustrated). Cellular interface 111 may be configured to receive and/or transmit 2G/3G/4G/LTE or other cellular data standard that is used now or hereafter.

In the illustrated embodiment of FIG. 1, processing logic 107 is coupled to wireless interface 113 to send and receive wireless data (including the access data). Processing logic 107 is also coupled to cellular interface 111 to send and receive cellular data (including the access data). In one embodiment, a memory coupled to processing logic 107 includes an access code.

Vehicle system 199 is communicatively coupled to controller unit 103 via communication channel 191 and vehicle reader 180 is communicatively coupled to vehicle system 199 via communication channel 195. In one embodiment, vehicle reader 180 is an RFID reader. Vehicle reader 180 is configured to transmit an interrogation signal 183 and is configured to receive a response signal 153 from a vehicle key stored in key locker 150, in some embodiments. Vehicle system 199 may have access to or include a vehicle computer that controls providing access to the vehicle and/or starting and stopping the vehicle. In one embodiment, vehicle system 199 includes a starting circuit that controls whether the vehicle can be started, by turning the keys in the ignition or by pushing a START/STOP button of the vehicle in combination with vehicle system 199 sensing a vehicle key.

Figure 2:
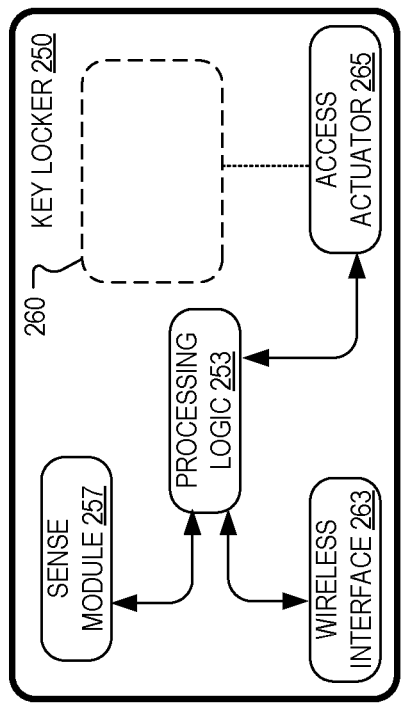
FIG. 2 includes an example key locker that includes an access actuator, wireless interface, processing logic, sense module, and key locker door, in accordance with an embodiment of the disclosure.
Figure 2:
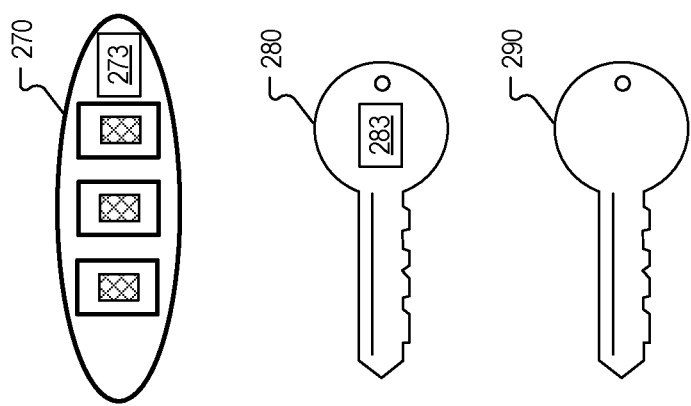

FIG. 1 also includes a key locker 150. Key locker 150 may be made of metal, plastic, or otherwise, depending on the particular embodiment. In some embodiments, key locker 150 is fabricated so that it shields the inside of the key locker 150 from radio waves/signals. To accomplish this, the key locker 150 may be made from metal, or incorporate a metal mesh, or otherwise form a faraday cage. FIG. 2 includes one example embodiment of key locker 150, in accordance with embodiments of the disclosure.

In FIG. 2, example key locker 250 includes an access actuator 265, wireless interface 263, processing logic 253, sense module 257, and key locker door 260. Processing logic 253 is coupled to sense module 257, wireless interface 263, and access actuator 265.

Wireless interface 263 may include antennas and corresponding circuitry to receive and/or transmit BlueTooth, cellular, and/or IEEE 802.11x wireless communication signals. Sense module 257 may include one or more of an accelerometer, a weight sensor, a magnetic sensor, an electrical resistance sensor, and/or a capacitive sensor.

Processing logic 253 may include one or more processors, microprocessors, multi-core processors, and/or Field Programmable Gate Arrays (FPGAs) to execute operations disclosed herein. One or more volatile and/or non-volatile memory (not illustrated) may be communicatively coupled to the processing logic 253 to store instructions to execute operations and/or store data.

Key locker 250 is sized to store a vehicle key such as key 270, 280, or 290.

Key 270 is an example wireless key that incorporates a remote control and a blade of the key is not required to access the vehicle and/or start/drive the vehicle. Key 270 includes a tag 273. Tag 273 may be a passive (unpowered) or an active (powered) tag. In one embodiment, tag 273 is an RFID tag configured to generate a response signal (e.g. 153) when the tag 273 receives an interrogation signal (e.g. 183) from an RFID reader (e.g. reader 180).

Key 280 is an example wireless key that may include a blade of a key for accessing the vehicle and/or start/drive the vehicle. Key 280 may also incorporate a remote control to access the vehicle. Key 280 includes a tag 283. Tag 283 may be a passive (unpowered) or an active (powered) tag. In one embodiment, tag 283 is an RFID tag configured to generate a response signal (e.g. 153) when the tag 283 receives an interrogation signal (e.g. 183) from an RFID reader (e.g. reader 180).

Key 290 is a blade-only key that is typically made from one piece of metal.

The implementation of key locker 250 may depend on what kind of vehicle key it will store.

Figure 3:
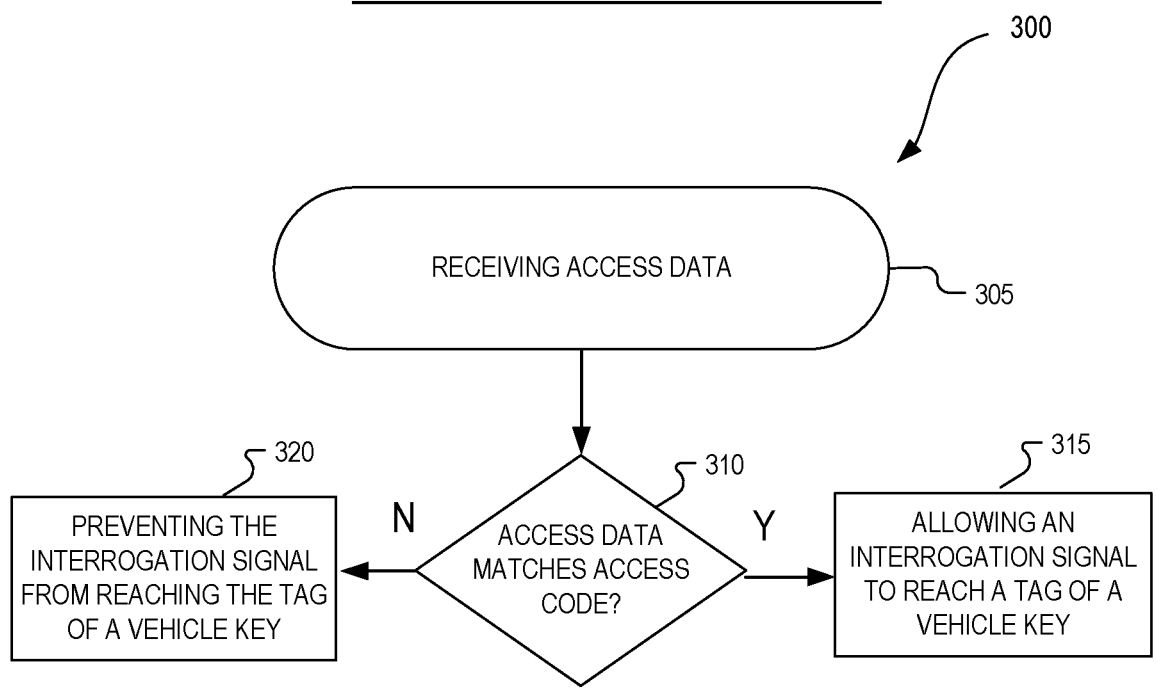
FIG. 3 illustrates an example process of providing access to a vehicle, in accordance with an embodiment of the disclosure.

FIG. 3 illustrates an example process 300 of providing access to a vehicle, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel. Process 300 may be used in conjunction with keys 270 and/or 280.

In process block 305 of process 300, access data is received. Access data may be received by controller unit 103 from keypad 140 or from mobile device 130, for example. In one embodiment, the access data is wireless access data. Access data may be received by wireless interface 263 from keypad 140 or from mobile device 130, in one example.

In process block 310, the access data is compared to an access code. In one embodiment, prior to process block 310, controller unit 103 receives the access code from wireless interface 113 or cellular interface 111 and stores the access code to a memory coupled to processing logic 107 or processing logic 253. The access code made be associated with a reservation of a vehicle for vehicle sharing purposes, in one example. Processing logic 107 or 253 may facilitate the comparison of the access data to the access code, in one embodiment.

When the access data matches the access code, process 300 proceeds to process block 315. In process block 315, an interrogation signal (e.g. signal 183) generated from outside a key locker (e.g. locker 150/250) is allowed to reach a tag (e.g. 273/283) of a vehicle key (e.g. 270/280) stored within the key locker. The tag of the vehicle key is configured to generate a response signal (e.g. 153) in response to receiving an interrogation signal (e.g. 183). The response signal allows access to the vehicle and/or allows a user to start/drive the vehicle when the response signal is received by a reader (e.g. 180) of the vehicle. For example, the tag of the vehicle key may have been factory set by the vehicle manufacturer to allow access and/or allow the vehicle to start/drive.

When the access data fails to match the access code, process 300 proceeds to process block 320. In process block 320, the interrogation signal (e.g. signal 183) generated from outside the key locker is prevented from reaching the tag (e.g. 273/283) of the vehicle key (e.g. 270/280) stored within the key locker. Since the interrogation signal never reaches the tag, no response signal is generated and sent back to reader 180 so the vehicle remains inaccessible or immobilized.

In one embodiment, allowing the interrogation signal generated from outside the key locker to reach the tag of the vehicle key includes moving a key locker door 260 included in key locker a distance (e.g. 0.5 inches) that allows the response signal from the tag to be transmitted outside the key locker. In one embodiment, the distance that the key locker door moves does not allow the vehicle key from being physically removed from the key locker.

As described above, the key locker may be made from a metal or be made from a plastic that incorporates a metal mesh or otherwise provides a faraday cage such that outside radio frequencies (at least within a certain frequency range) do not penetrate the key locker. Hence, by opening a key locker door 260, it allows radio signals such as interrogation signal 183 to enter the key locker and illicit a response signal 153 from a tag of a vehicle key that can be sensed by a reader (e.g. 180) of the vehicle.

In one embodiment, access actuator 265 receives an actuation signal from processing logic 107 of controller unit 103. In one embodiment, access actuator 265 receives an actuation signal from processing logic 253. Access actuator 265 may include a stepper motor that is mechanically coupled to key locker door 260 to open the key locker door 260 a distance defined by the actuation signal. In some embodiments, a servo, motor, actuator, or combination may be utilized to move key locker door 260.

In accordance with one embodiment of the disclosure, an example system includes a wireless interface (e.g. 113 or 263) for receiving wireless access data from a mobile device such as a smartphone, phablet, or tablet. The system further includes processing logic, a memory, and a key locker. The key locker includes a key locker door and an access actuator. The processing logic is coupled to the wireless interface to receive the wireless access data. The memory is coupled to the processing logic and the memory includes an access code. The key locker is sized to store a vehicle key having an RFID tag. The key locker shields the vehicle key from radio signals that are outside the key locker when the key locker door is closed. The access actuator (e.g. 265) is coupled to open and close the key locker door. The access actuator is coupled to the processing logic and the processing logic is configured to cause the access actuator to move the key locker door when the wireless access data matches the access code stored in memory. The key locker door is moved a distance by the access actuator to allow the RFID tag of the vehicle key to receive an interrogation signal generated by an RFID reader of the vehicle and send a response signal to the RFID reader in response to receiving the interrogation signal where the response signal allows access to the vehicle and/or driving access to the vehicle.

Figure 4:
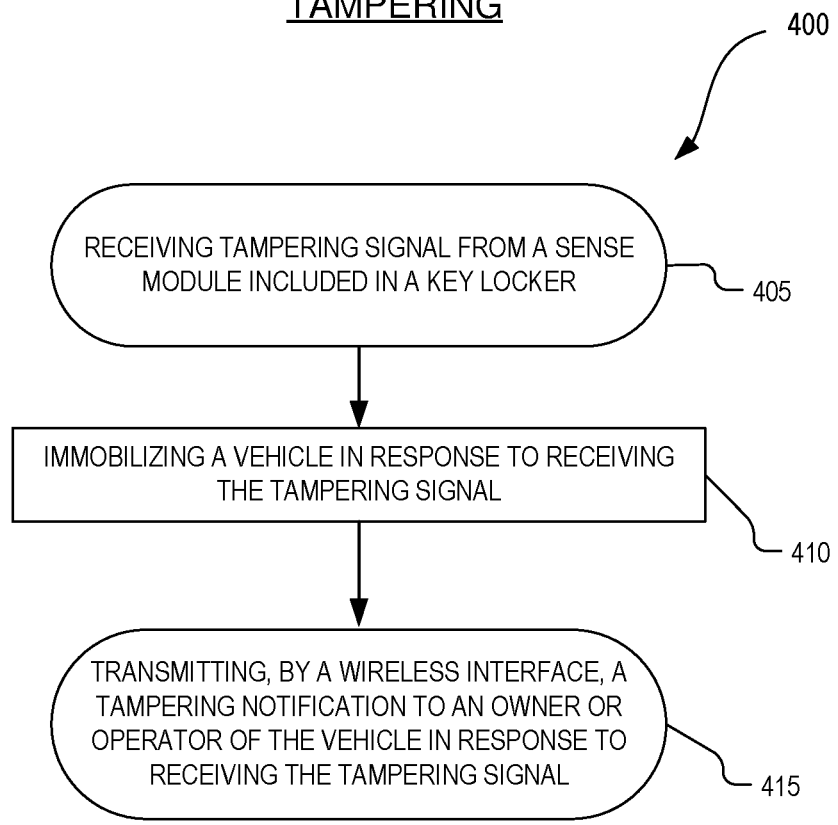
FIG. 4 illustrates an example process of immobilizing a vehicle due to tampering, in accordance with an embodiment of the disclosure.

FIG. 4 illustrates an example process 400 of providing access to a vehicle, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel. Process 400 may be used in conjunction with keys 270, 280, and/or 290.

In operation 405 of process 400, a tampering signal is received from a sense module (e.g. 257) included in a key locker. In one embodiment, the sense module includes an accelerometer and the tampering signal includes an acceleration measurement from the accelerometer that is above a pre-determined acceleration threshold. A large change in acceleration may be generated from a hammer striking the key locker or other tampering attempt, for example.

In one embodiment, the sense module includes a weight sensor and the tampering signal includes a weight measurement from the weight sensor that is below a key weight value that is representative of a weight of the vehicle key. In one embodiment, the sense module includes a magnetic sensor and the tampering signal includes a magnetic measurement from the magnetic sensor where the magnetic sensor is disposed within the key locker to measure a magnetic field of the vehicle key. If there are large changes in weight or a magnetic field measurement, it may indicate that the vehicle key has been removed from the key locker and tampered with.

In one embodiment, the sense module includes an electrical resistance sensor and the tampering signal includes a resistance measurement from the electrical resistance sensor. In one embodiment, the electrical resistance sensor is disposed within the key locker to contact a blade of the vehicle key when the vehicle key is stored in the key locker. In one embodiment, the electrical resistance sensor includes a resistive network that incorporated into the structure of the key locker such that someone who penetrates the resistive network (e.g. by drilling through the key locker to access the vehicle key) will change the resistance of the resistive network to trigger a tampering signal.

In operation 410, a vehicle is immobilized in response to receiving the tampering signal. In one embodiment, processing logic 107 receives the tampering signal from sense module 257 via a wired and encrypted data link and immobilizes the vehicle by sending a CAN bus message to the vehicle system 199 that immobilizes the vehicle. In one embodiment, processing logic 107 receives the tampering signal from sense module 257 and immobilizes the vehicle by creating an open circuit (e.g. by activating a relay) of the ignition/starting system of the vehicle.

In one embodiment where key locker box is a standalone unit and doesn't necessarily require controller unit 103, processing logic 253 receives the tampering signal from sense module 257 and immobilizes the vehicle by sending a CAN bus message to the vehicle system 199 that immobilizes the vehicle. In one embodiment, processing logic 253 receives the tampering signal from sense module 257 and immobilizes the vehicle by creating an open circuit (e.g. by activating a relay) of the ignition/starting system of the vehicle.

In operation 415, a tampering notification is transmitted, by a wireless interface (e.g. 113 or 263), to an owner or operator of the vehicle in response to receiving the tampering signal. In one embodiment, the tampering notification is sent via cellular data. In one embodiment, the tampering notification is sent using WiFi.

Figure 5:
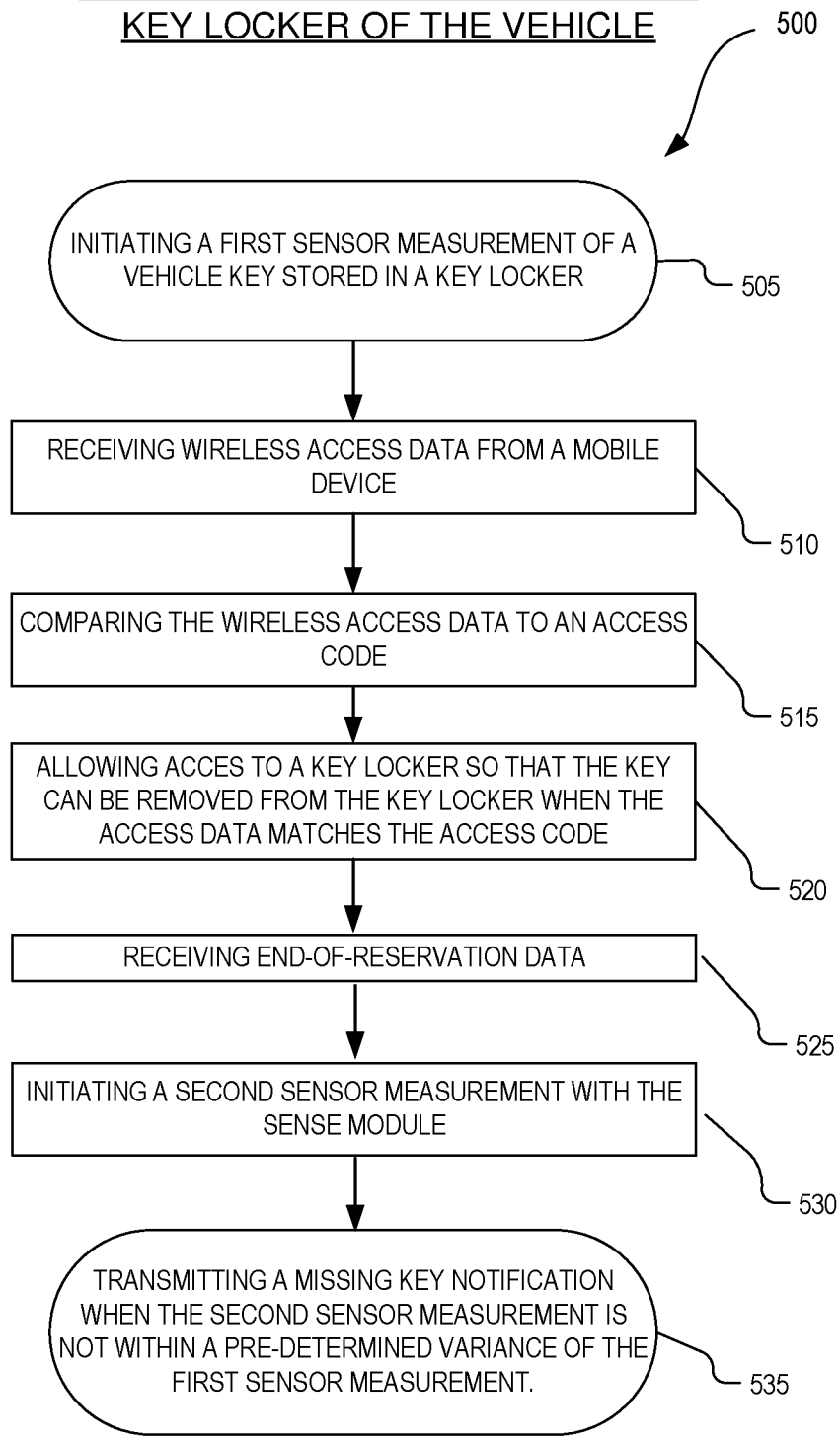
FIG. 5 illustrates an example process of notifying a vehicle operator of tampering with a key locker of the vehicle, in accordance with an embodiment of the disclosure.

FIG. 5 illustrates an example process 500 of providing access to a vehicle, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. Process 500 may be used in conjunction with keys 270, 280, and/or 290.

In process block 505, a first sensor measurement is initiated of a vehicle key stored within a key locker. The first sensor measurement is performed by a sense module (e.g. 257) included in the key locker. The sensor measurement may be a magnetic sensing of the blade of the key, a weighing of the key, an electrical resistance measurement where the blade of the key completes (shorts) a resistive circuit to indicate that the key is within the key locker.

In process block 510, wireless access data is received from a mobile device.

In process block 515, the wireless access data is compared to an access code. The comparison of process block 515 may be performed by processing logic 107 or 253.

In process block 520, access to the key locker is allowed so that a user can remove the vehicle key stored within the key locker when the access data matches the access code. In one embodiment, the processing logic causes an access actuator (e.g. 265) to release a mechanical latch or a magnetic latch that allows a user to remove a cover of the key locker so that the user can remove the vehicle key.

In process block 525, end-of-reservation data is received. In one embodiment, the end-of-reservation data is received by a wireless interface (e.g. 113 or 263) or a cellular interface (e.g. 111). In one embodiment, the end-of-reservation is received from a mobile device (e.g. 130). In one embodiment, the end-of-reservation data may be sent by a server that coordinates the reservation of the vehicle.

In process block 530, a second sensor measurement is initiated with the sense module included in the key locker subsequent to receiving the end-of-reservation data. If the first sensor measurement was a weight measurement of the vehicle key, the second sensor measurement will also be of the weight of the vehicle key. If the user has put the key back in the locker box after his/her reservation, the second sensor measurement should be similar to the first sensor measurement. However, if the user of the vehicle has not put the vehicle key back in the key locker at the end of the reservation (indicated by the end-of-reservation data being received), then the second weight measurement of the vehicle key will be significantly less than the first weight measurement. Similarly, the first and second magnetic or resistance measurements can be compared to make sure they are similar. Hence, it is possible to determine whether the vehicle key has been put back into the key locker at the end of the reservation.

In process block 535, a missing key notification is transmitted via a wireless interface when the second sensor measurement is not within a pre-determined variance of the first sensor measurement. The missing key notification may be transmitted via WiFi or cellular data to a server that coordinates the reservation of the vehicle.

As described above, some embodiments include a tag (e.g. 273/283) being included in a vehicle key and the key locker opening to allow the tag to be interrogated. These embodiments offer the advantage of placing the key locker in locations that are fairly inaccessible to the user. For example, the key locker could be put under a seat or secured under the dash in a location out of site to a user and still allow the vehicle to be accessed and driven by the user. Since the user doesn't know the location of the key locker, it is more difficult to tamper with the key locker or otherwise access the key.

In embodiments where the vehicle key does not include a tag, the key will need to be accessed by the user to insert the blade of the key into the ignition to start the vehicle. In these embodiments, the vehicle key will need to be accessible for the user to remove and thus the key locker will need to be placed somewhere accessible such as the glove box, center console, or trunk.

It is understood by those skilled in the art, that in some embodiments, the key locker may include its own processing logic and wireless interface and/or cellular interface while in other embodiment, the key locker may only include the access actuator and/or the sense module 257 and the described processing logic and wireless/cellular interface will be provided external to the key locker, by controller unit 103 for example. In some embodiments, both controller unit 103 and the key locker include processing logic and wireless and cellular interfaces.

Figure 6:
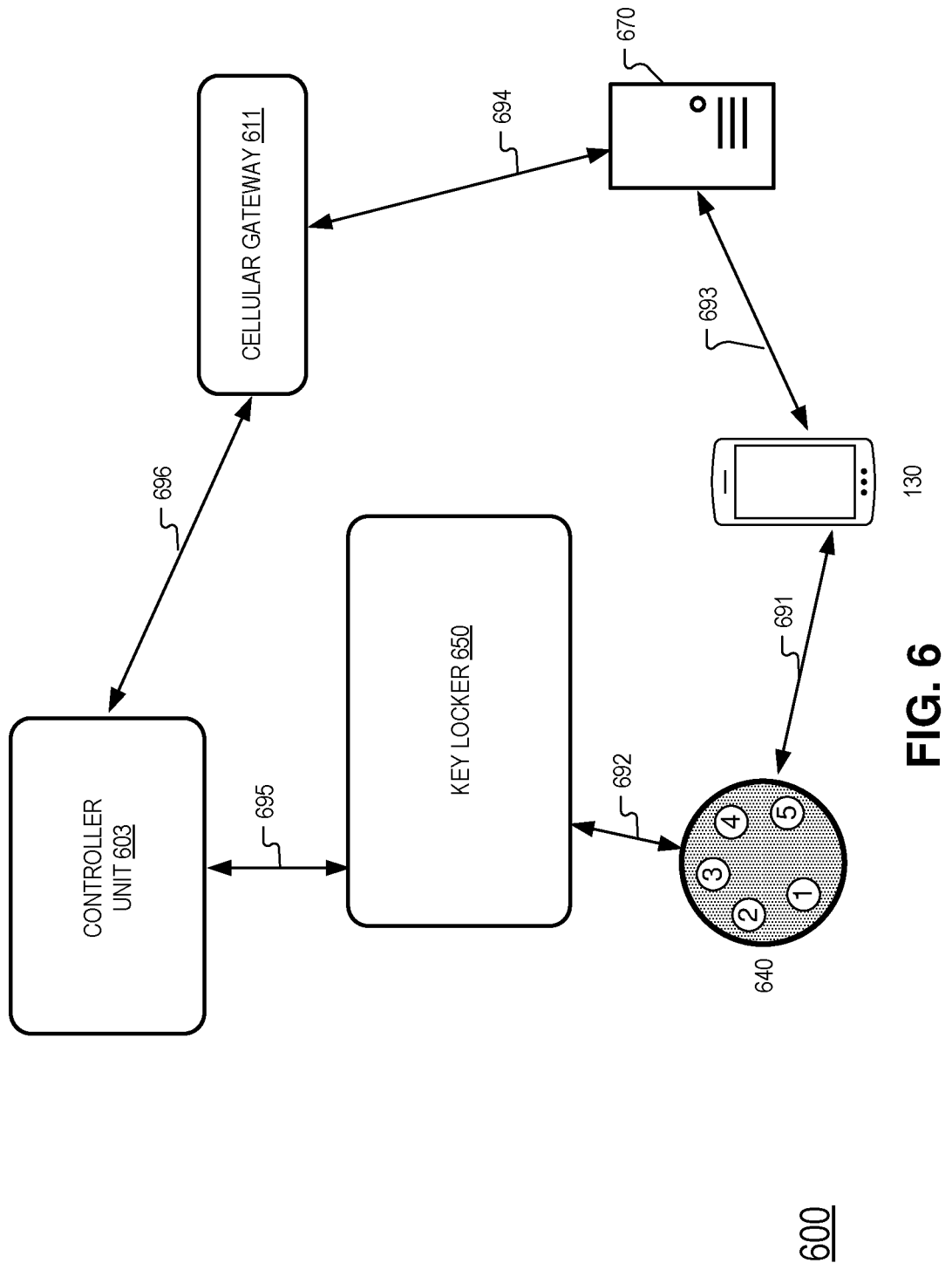
FIG. 6 illustrates an example system that includes a controller unit, a keypad, a mobile device, a key locker, a server, and a cellular gateway, in accordance with an embodiment of the disclosure.

FIG. 6 includes an example system 600 that includes a controller unit 603, a keypad 640, a mobile device 130, a key locker 650, a server 670, and a cellular gateway 611, in accordance with an embodiment of the disclosure. Controller unit 603 may include processing logic that may include one or more processors, microprocessors, multi-core processors, and/or Field Programmable Gate Arrays (FPGAs) to execute operations disclosed herein. One or more volatile and/or non-volatile memory (not illustrated) may be communicatively coupled to the processing logic in controller unit 603 to store instructions to execute operations and/or store data.

In FIG. 6, mobile device 130 is communicatively coupled to controller keypad 640 via communication channel 691. In FIG. 6, mobile device 130 is also communicatively coupled to server 670 via communication channel 693. Keypad 640 is communicatively coupled to key locker 650 via communication channel 692. In one embodiment, communication channel 692 includes a wired serial communication channel. Key locker 650 is communicatively coupled to controller unit 603 via communication channel 695. Controller unit 603 is communicatively coupled to cellular gateway 611 via communication channel 696 and cellular gateway 611 is communicatively couple to server 670 via communication channel 694. Communication channels 691, 692, 693, 694, 695, and 696 may be wireless communication channels (e.g. BlueTooth and/or WiFi/802.11x) or wired communication channels (e.g. CAN bus, utilizing I2C, USB, and/or SPI protocols). Controller unit 603 may be coupled to selectively immobilize a vehicle by disabling the ignition.

In one embodiment, mobile device 130 requests a vehicle reservation by accessing server 670 using a mobile browser or mobile application via WiFi or cellular data. In response to receiving the vehicle request, server 670 may provision the reserved vehicle with an access code by transmitting the access code to cellular gateway 611 via a cellular data network. Cellular gateway 611, controller unit 603, key locker 650, and keypad 640 may all be included in a vehicle. Cellular gateway 611 may pass the access code to control unit 603 which may pass the access code to the key locker 650. When the mobile device 130 is proximate to the reserved vehicle, it may communicate the access code to the keypad via BlueTooth and the keypad may pass the access code to the key locker 650 via a wired serial data interface. If the access code received by key locker 650 from keypad 640 matches the access code delivered to cellular gateway 611, the key locker may open the key locker door 260 to allow an RFID reader of the vehicle to receive an RFID signal from an RFID tag of a key stored in key locker 250 to mobilize the vehicle.

Figure 7:
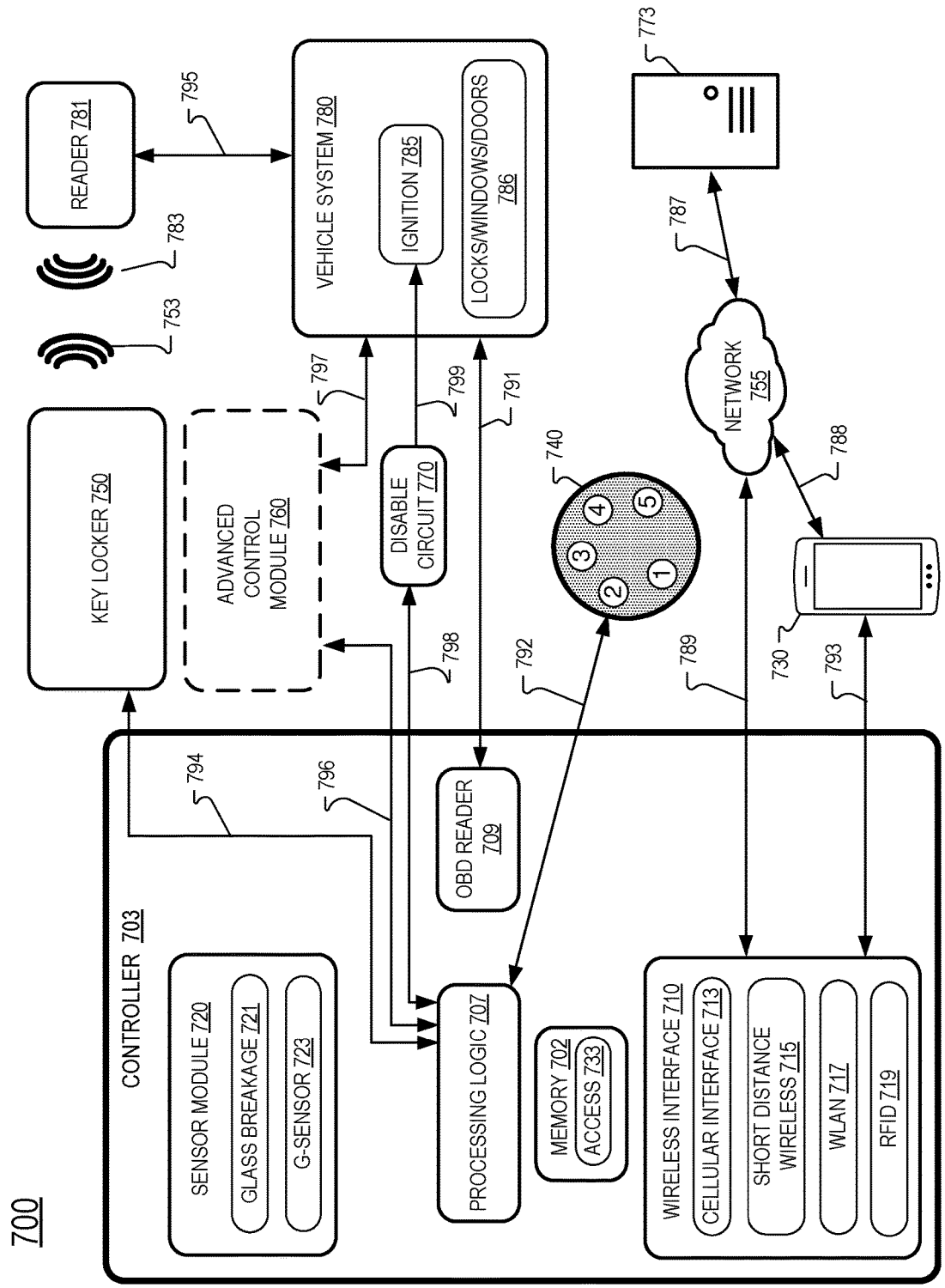
FIG. 7 illustrates an example system for providing access to a vehicle, in accordance with an embodiment of the disclosure.

FIG. 7 illustrates an example system 700 for providing access to a vehicle, in accordance with an embodiment of the disclosure. System 700 may be installed in a vehicle. Reader 781 and vehicle system 780 may be originally installed by the manufacturer of the vehicle. System 700 includes a controller 703 that includes processing logic 707, memory 702, On-Board Diagnostics (OBD) Reader 709, wireless interface 710, and sensor module 720. Processing logic 707 may include one or more processors, microprocessors, multi-core processors, and/or Field Programmable Gate Arrays (FPGAs) to execute operations disclosed herein. In some embodiments, memories (not illustrated) are integrated into the processing logic to store instructions to execute operations and/or store data. Processing logic may include analog or digital circuitry to perform the operations disclosed herein. In the illustrated embodiment, memory 702 includes access code(s) 733.

In FIG. 7, wireless interface 710 includes cellular interface 713, short distance wireless interface 714, wireless local area network (WLAN) interface 717, and RFID interface 719. Different embodiments of wireless interface 710 may include all or some of the wireless interfaces illustrated. Cellular interface 713 may be configured to receive and/or transmit 2G/3G/4G/LTE/5G or other cellular data standard that is used now or hereafter. Short distance wireless interface 715 may be configured to receive and/or transmit protocols such as Zigbee or BlueTooth. WLAN 717 may be configured to receive and/or transmit IEEE 802.11x protocols and frequencies. RFID interface 719 may be configured to transmit or receive RFID signals to read or interrogate an RFID tag, such as an RFID tag included in a mobile device such as device 730.

Sensor module 720 in FIG. 7 includes a glass breakage sensor 721 and a G-sensor 723. The glass breakage sensor may include a microphone to receive audio signals. The audio signals may be filtered or compared to audio signals associated with vehicle glass breakage. G-sensor 723 may include an accelerometer. When an acceleration reading measured by the accelerometer reaches a pre-determined threshold, the acceleration reading may indicate that controller 703 or a vehicle that includes controller 703 is being tampered with.

Although not illustrated, processing logic 707 is communicatively coupled to read and write to memory 702. Processing logic 707 is also communicatively coupled to wireless interface 710, sensor module 720, and OBD Reader 709.

System 700 further includes key locker 750, reader 781, advanced control module 760, disable circuit 770, keypad 740, a mobile device 730, network 755, and server 773. Keypad 740 and mobile device 730 may be configured similarly to keypad 140 and mobile device 130, respectively. Reader 781 may be configured similarly to reader 180.

Vehicle system 780 includes ignition module 785 and locks/windows/doors module 786, in the illustrated embodiment of FIG. 7. Module 786 of vehicle system 780 may control unlocking the vehicle, opening and closing of the windows, and monitoring the opening and closing of the doors. Vehicle system 780 may also include a light module (not illustrated) to turn the lights of the vehicle on and off.

OBD reader 709 may be communicatively coupled to vehicle system 780 via communication channel 791. OBD reader 709 may access the status of ignition module 785 and module 786. OBD reader 709 may receive vehicle system data from vehicle system 780 such as vehicle mileage, engine status, maintenance warnings, and other vehicle data. This data may be passed to processing logic 707 and transmitted to server 773 via wireless interface 710 and network 755.

Processing logic 707 of controller 703 is communicatively coupled to key locker 750 (via communication channel 794), advanced control module 760 (via communication channel 796), disable circuit 770 (via communication channel 798), and keypad 740 (via communication channel 792).

In operation, server 773 may provision controller 703 with one or more access codes 733 by transmitting the access code(s) via communication channels 787, network, 755, communication channel 789, and cellular interface 713. Network 755 may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

After controller 703 is provisioned with one or more access codes 733, a user may provide access data to controller 703 with keypad 740 or mobile device 730. Mobile device 730 may provide the access data to controller 703 by way of any of the interfaces in wireless interface 710. Mobile device 730 may receive the access data from server 773 via communication channel 787, network 755, and communication channel 788. When the access data provided by the user matches the access code 733 stored in memory 702, an access signal may be sent to key locker 750 via communication channel 794 from processing logic 707. In an embodiment, key locker 750 opens a key locker door to allow a radio device of a vehicle key stored in the key locker to receive interrogations signal(s) 783 generated by reader 781 and illicit a response signal 753 from a vehicle key stored in key locker 750. Based at least in part on the response signal 753 received by reader 781, reader 781 may enable ignition module 785 to start/mobilize the vehicle.

In some embodiments, processing logic 707 sends advanced control module 760 commands via communication channel 796 to correspond with vehicle system 780 via communication channel 797. Communication channel 797 may utilize a CAN protocol. In one example, module 760 directs vehicle system 780 to unlock the doors of the vehicle when the access data matches the access code so that a user can gain access to the vehicle. In one embodiment, processing logic 707 may cause disable circuit 770 to disable ignition module 785 of vehicle system 780 until the provided access data matches access code 733. In one embodiment, disable circuit 770 immobilizes the vehicle ignition by creating an open circuit (e.g. by activating a relay) of the ignition/starting module 785 of vehicle system 780.

Figure 8:
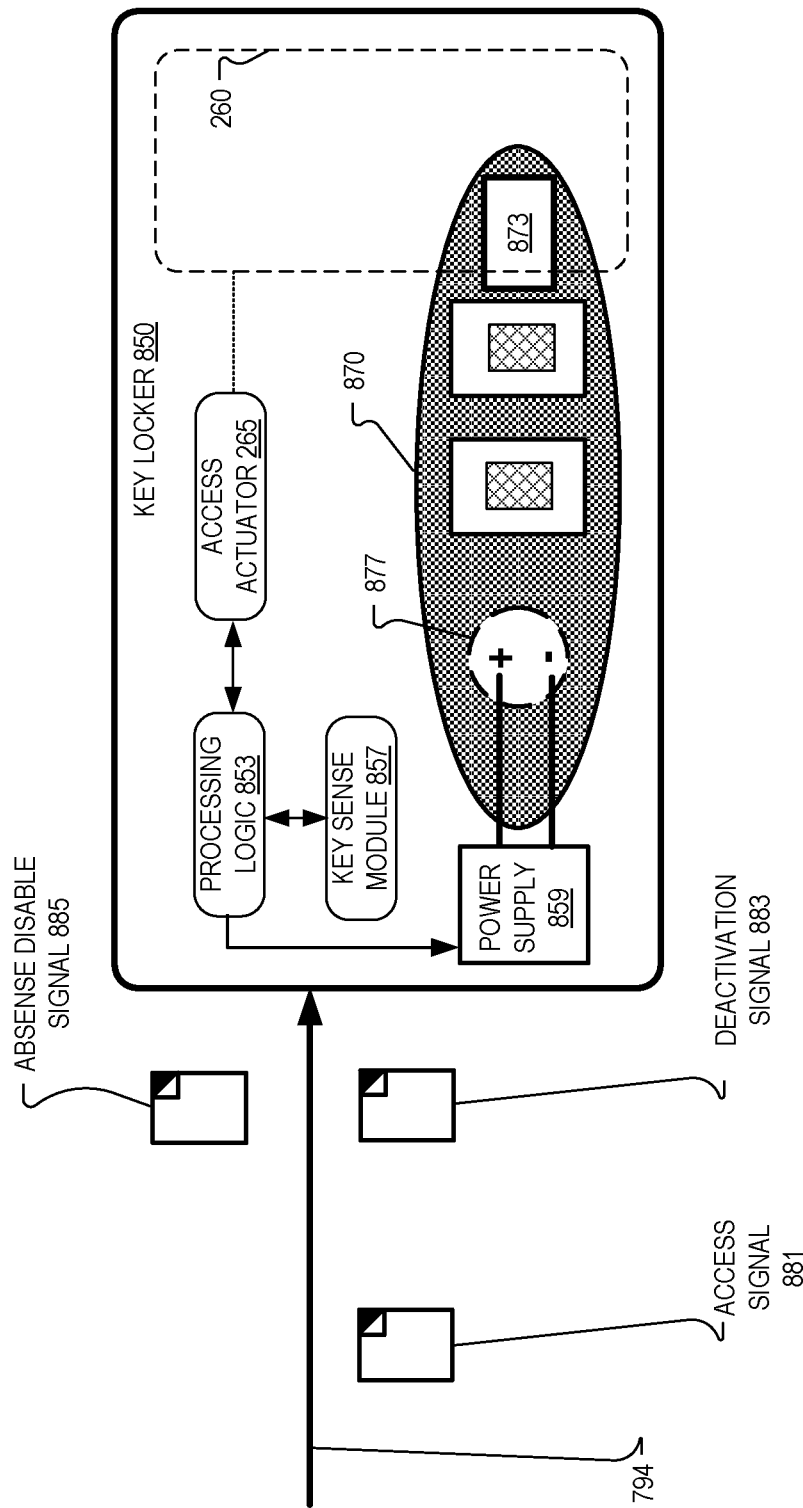
FIG. 8 illustrates an example key locker, in accordance with an embodiment of the disclosure.

FIG. 8 illustrates an example key locker 850, in accordance with an embodiment of the disclosure. Key locker 850 is one example of key locker 750. Key locker 850 includes a key locker body that may be a box shape (or other shape) having a cavity sized to store a vehicle key such as vehicle key 870. Example vehicle key 870 includes radio device 873 that may be an RFID tag. The RFID tag may be configured similarly to RFID tag 273. Example key locker 850 includes processing logic 853, key sense module 857, selectable power supply 859, access actuator 265, and key locker door 260.

Access actuator 265 is coupled to move key locker door 260. Access actuator 265 may include a stepper motor that is mechanically coupled to key locker door 260 to open the key locker door 260 a distance defined by the actuation signal. In some embodiments, a servo, motor, actuator, or combination may be utilized to move key locker door 260.

Access actuator 265 is configured to open key locker door 260 in response to receiving access signal 881. Access signal 881 may be provided by processing logic 707 when access data provided by a user matches an access code 733 provided by server 773. Access signal 881 may be transmitted over communication channel 794 and relayed to access actuator 265 via processing logic 853.

When key locker door 260 is closed, the key locker body shields radio device 873 from receiving or transmitting radio signals (e.g. signals 753 and 783) outside the key locker body of key locker 850. When key locker door 260 is open, radio signals (e.g. signals 753 and 783) may be received by and/or transmitted from the radio device 873 of vehicle key 870. In some embodiments, the distance that the key locker door 260 is opened does not allow the vehicle key 870 to be removed from the key locker.

In some embodiments, the key locker body includes a metal material to shield the radio device 873 of the vehicle key 870 from the interrogation signals 783 of reader 781. The key locker body may include a plastic (e.g. ABS) and the metal material may be included in a mesh sized to prevent reception or transmission of a particular frequency of radio signals.

Key locker 850 includes a selectable power supply 859 for providing electrical power to vehicle key 870. A battery for powering key 870 may be removed and an insert 877 sized to fit a battery compartment of the vehicle key 870 may be inserted into key 870 to power key 870 via an electric power provided by power supply 859. The selectable power supply 859 is configured to provide electrical power within a tolerance to properly power the vehicle key 870.

In a particular example context, controller 703 may sense tampering with the vehicle that it is installed in via sensor module 720. Processing logic 707 may then generate a deactivation signal 883 and provide it to processing logic 853 or directly to power supply 859. Selectable power supply 859 is configured to deactivate the electrical power from the vehicle key in response to the deactivation signal 883.

In FIG. 8, key locker 850 includes a key sense module 857. Key sense module 857 is configured to sense a presence of the vehicle key 870 within the key locker body. Key sense module 857 may be configured to generate an absence disable signal 885 to disable the vehicle when a sense reading of the key sensor indicates the vehicle key has been removed from the key locker body. Absence disable signal 885 may be sent to processing logic 707 via communication channel 794 and processing logic 707 may immobilize the vehicle in response to receiving the absence disable signal 885. Processing logic 707 may immobilize the vehicle by sending a disable signal to disable circuit 770, in one embodiment. Processing logic 707 may immobilize the vehicle by sending a disable signal to advanced control module 760 that is relayed to vehicle system 780 to immobilize ignition module 785, in one embodiment.

In one embodiment, key sense module 857 includes a pressure sensor and the sense reading of key sense module 857 includes a pressure reading. The absence disable signal 885 may be generated when the pressure reading of the pressure sensor falls below a pressure threshold that indicates the key have been removed from the key locker 850.

Figure 9:
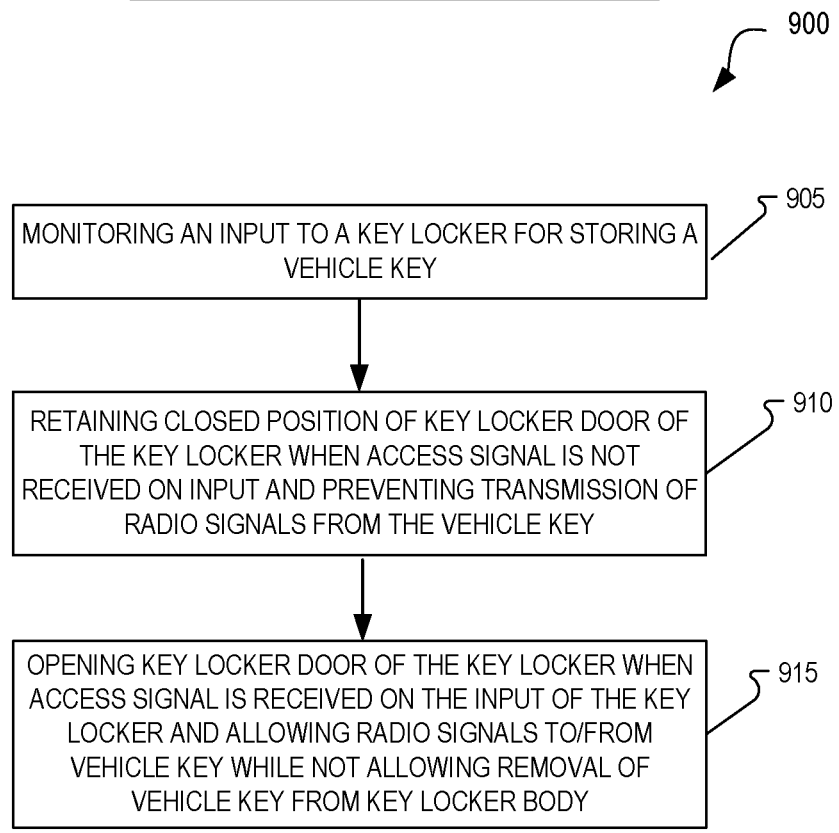
FIG. 9 illustrates an example process of providing access to a vehicle, in accordance with an embodiment of the disclosure.

FIG. 9 illustrates an example process 900 of providing access to a vehicle, in accordance with an embodiment of the disclosure. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel.

In operation 905, an input (e.g. communication channel 794) to a key locker (e.g. key locker 850) is monitored.

In operation 910, a closed position for the key locker door is retained when an access signal (e.g. 881) is not received on the input of the key locker. The key locker body and the key locker door in the closed position prevents reception or transmission of radio signals by a radio device of the vehicle key.

In operation 915, the key locker door of the key locker is opened in response to receiving the access signal on the input of the key locker. Opening the key locker door allows radio signals to be received and transmitted by the radio device of the vehicle key while not allowing the vehicle key to be removed from the key locker body, in one embodiment. In another embodiment, the key locker door is opened wide enough so that the vehicle key may be removed from the key locker body (and also allows radio signals to be received and transmitted by the radio device of the vehicle key).

In embodiments of the disclosure, particular access code(s) may be associated with allowing a vehicle key to be removed from the vehicle key locker, to facilitate longer term rentals, for example. In this context, the key locker door may be removable by the user or the access actuator may open the key locker door a distance to allow the key to be removed. In other embodiments, particular access codes are associated with retaining the vehicle key in the key locker at all times and not allow a user to remove the vehicle key from the key locker. This may facilitate short-term rentals, for example. The access actuator may move the key locker door different distances depending on the access signal received. The access signal may vary based on what access data is provided to the system.

Process 900 may further include operations of receiving a deactivation signal and deactivating electrical power provided to the vehicle key in response to receiving the deactivation signal.

In one embodiment, process 900 may further include operations of sensing, with a key sensor (e.g. 857) of the key locker, whether the vehicle key is present in the key locker and transmitting, an absence disable signal (e.g. 885) when a sense reading of the key sensor indicates the vehicle key has been removed from the key locker body.

In some embodiments of key locker 150, 250, 650, 750, and/or 850, a battery backup (e.g. Lithium Ion) is provided so that any processing logic, memory, wireless interfaces, and access actuators included in the key locker may be functional even when a vehicle battery is dead. This may allow a user to access the key of the vehicle for purposes of unlocking the vehicle and jumping the vehicle, for example. Key locker 150, 250, 650, 750, and/or 850 may only switch to the battery backup when the main power of the vehicle is off.

In some embodiments of key locker 150, 250, 650, 750, and/or 850, a selectable voltage may be provided to power a key inside the key locker instead of powering the key with a battery. The provided voltage may be selected using a jumper to select between 3 VDC, 6 VDC, and 12 VDC, depending on the voltage requirements to power the key. The provided voltage could power the key using an "inset" that would replace the battery of the key. Thus, the battery of the key would not be a failure point of the system since it could be powered by an inset that is powered by the vehicle power.

The above disclosure has been discussed in the context of vehicle sharing although it is contemplated that systems and methods of this disclosure could be used in the context of vacation rentals or short-term housing rentals to provide key access to a property for a limited period of time.

The term "processing logic" in this disclosure may include one or more processors, microprocessors, multi-core processors, and/or Field Programmable Gate Arrays (FPGAs) to execute operations disclosed herein. In some embodiments, memories (not illustrated) are integrated into the processing logic to store instructions to execute operations and/or store data. Processing logic may include analog or digital circuitry to perform the operations disclosed herein. A "memory" or "memories" (e.g. 702) described in this disclosure may include volatile or non-volatile memory architectures.

Communication channels described herein may include wired or wireless communications utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), or otherwise.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A device comprising:
    a key locker body sized to store a key including a radio device of the key;
    a key locker door, wherein the key locker body is configured to shield the radio device of the key from receiving or transmitting radio signals outside the key locker body when the key locker door is closed; and
    an access actuator for opening the key locker door in response to an access signal, wherein opening the key locker door includes the access actuator moving the key locker door to allow the radio device of the key to receive the radio signals, and wherein a distance that the key locker door is opened does not allow the key to be removed from the key locker body.

2. The device of claim 1 further comprising:
    a selectable power supply for providing electrical power to vehicle key, wherein the electrical power is within a tolerance to properly power the vehicle key, and wherein the selectable power supply is configured to deactivate the electrical power from the vehicle key in response to the selectable power supply receiving a deactivation signal.

3. The device of claim 2 further comprising
    an insert sized to fit a battery compartment of the vehicle key, wherein the insert is configured to receive the electrical power from the selectable power supply and deliver it to the vehicle key.

4. The device of claim 1, wherein the radio device includes an RFID tag.

5. The device of claim 4, wherein the RFID tag is an active RFID tag being powered by a power source.

6. The device of claim 4, wherein the key locker body includes a metal material to shield the RFID tag of the key from the radio signals.

7. The device of claim 6, wherein the key locker body includes a plastic and the metal material is included in a mesh sized to prevent reception or transmission of the radio signals.

8. A computer-implemented method of providing access to a vehicle comprising, the method comprising:
monitoring an input to a key locker, wherein the key locker includes a key locker body sized to store a vehicle key;
preventing an interrogation signal generated by a vehicle radio-frequency identification (RFID) reader from reaching an RFID tag of the vehicle key when an access signal is not received on the input of the key locker; and
allowing the interrogation signal generated by the vehicle RFID reader to reach the RFID tag of the vehicle key in response to receiving the access signal on the input of the key locker.

9. The computer-implemented method of claim 8, wherein the vehicle key is not removable from the key locker body when the interrogation signal is allowed to reach the RFID tag of the vehicle key.

10. The computer-implemented method of claim 8 further comprising:
receiving, by the key locker, a deactivation signal; and
deactivating electrical power provided to the vehicle key in response to receiving the deactivation signal, the electrical power being within a tolerance to properly power the RFID tag of the vehicle key.

11. The computer-implemented method of claim 8 further comprising:
sensing, with a key sensor of the key locker, whether the vehicle key is present in the key locker; and
transmitting, an absence disable signal when a sense reading of the key sensor indicates the vehicle key has been removed from the key locker body.

12. The computer-implemented method of claim 8, wherein the key locker includes a plastic and a metal material arranged as a mesh sized to prevent reception of the interrogation signal.

13. A vehicle system comprising:
a communication interface;
a key locker that is sized to store a vehicle key having a radio-frequency identification (RFID) tag;
a memory including an access code stored in the memory;
processing logic configured to receive the access code, wherein the processing logic is configured to:
shield the RFID tag of the vehicle key from an interrogation signal generated by a vehicle RFID reader;
receive access data via the communication interface; and
allow the interrogation signal generated by the vehicle RFID reader to reach the RFID tag of the vehicle key when the access data matches the access code.

14. The vehicle system of claim 13, wherein the communication interface is a wireless communication interface, and wherein the access data is wireless access data.

15. The vehicle system of claim 14, wherein the wireless access data is received from a mobile device.

16. The vehicle system of claim 14, wherein the wireless communication interface is included in the key locker.

17. The vehicle system of claim 14, wherein the access code is received via the wireless communication interface.

18. The vehicle system of claim 13, wherein the access data is received from a keypad.

19. The vehicle system of claim 13, wherein the interrogation signal generated by the vehicle RFID reader illicits a response signal from the RFID tag of the vehicle key when the interrogation signal reaches the RFID tag, and wherein the response signal allows a vehicle to be driven.

20. The vehicle system of claim 13, wherein the RFID tag is an active RFID tag being powered by a power source.

* * * * *